Dec. 18, 1951  A. SEGAL  2,578,846
INTERMITTENT POWER SUPPLY SYSTEM
Filed July 30, 1947
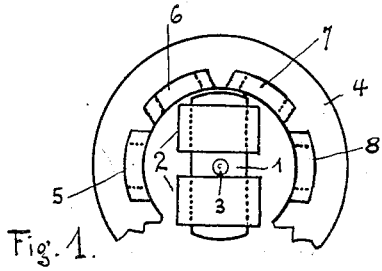
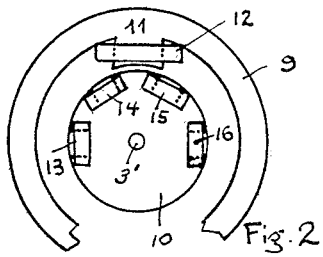
Fig. 1.   Fig. 2.
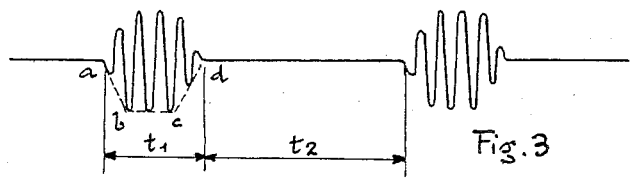
Fig. 3.
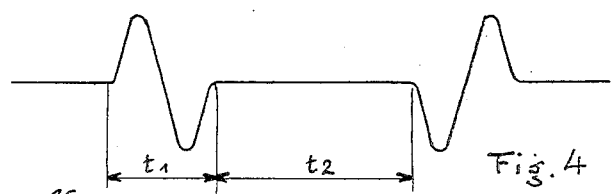
Fig. 4.
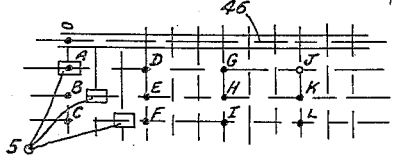
Fig. 7.
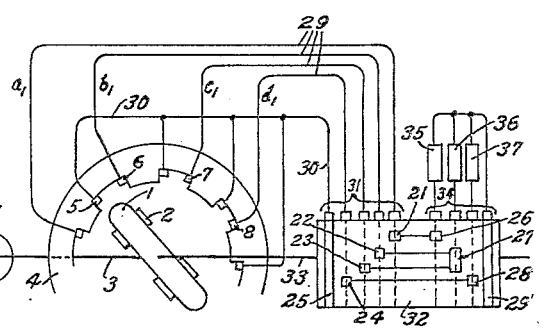
Fig. 5.
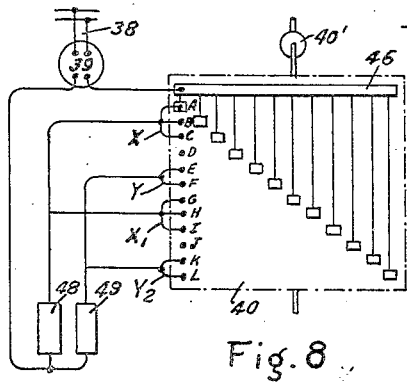
Fig. 8.
Inventor:
Abram Segal
by David Rines,
Attorney Patented Dec. 18, 1951

2,578,846

UNITED STATES PATENT OFFICE 2,578,846

INTERMITTENT POWER SUPPLY SYSTEM

Abram Segal, Rueil-Malmaison, France

Application July 30, 1947, Serial No. 764,873
In France May 15, 1946

Section 1, Public Law 690, August 8, 1946
Patent expires May 15, 1966

27 Claims. (Cl. 171—97)

The present invention relates to power systems for supplying intermittent power pulses of controllable forms to a plurality of load circuits. Though the invention is of general applicability, it finds particular use in supplying power to welding machines of the spot-welding and seam-welding types.

Present-day supply systems of this kind comprise sources of power pulses based upon the principle of alternating-current modulation, which are subject to serious disadvantages. Their overall efficiency is very low because, during the intervals between current pulses, they are running idle, and special measures have to be taken in order to obtain a zero output voltage between the successive pulses. The shape of their current pulses can not be modified at will and adapted to the nature of work; the power output is very irregular, etc.

An object of the present invention, therefore, is to produce by a suitable grouping of individual pulses resulting pulses of the above-described character suitably adapted to the nature of work to be performed in every load circuit, and to obtain a much better efficiency of the sources.

A further object is to utilize this energy to provide a substantially continuous or constant power output.

Another object is to provide a new and improved system for supplying periodic or intermittent pulses simultaneously to a plurality of load circuits, the said pulses being produced by any kind of generator.

Another object still is to vary the length of the intervals between the pulses.

Still a further object is to vary the length of the pulses themselves.

A further object of the invention is to provide a new and improved pulse-generating system of the above-described character that shall be very efficient at high frequencies.

Other and further objects will be described hereinafter, and will be particularly pointed out in the appended claims.

The invention will now be more fully explained in connection with the accompanying drawings, in which Fig. 1 is a diagrammatic elevation, partly broken away, of a generator producing a plurality of series of periodic or intermittent pulses embodying the present invention; Fig. 2 is a similar view of a modification; Figs. 3 and 4 are diagrams illustrating current-wave forms of different types that may be provided by the above generator; Fig. 5 is a diagrammatic view of circuits and apparatus, shown partly broken away, of a power-supply system for delivering combined pulses in accordance with the present invention to a plurality of load circuits, such as electric-welding systems; Fig. 6 is a diagram similar to Figs. 3 and 4, illustrating a single series of current pulses separated by very small time intervals; and Figs. 7 and 8 are diagrammatic views of modifications.

The generator of periodic or intermittent pulses illustrated in Fig. 1 is of the known rotary-transformer type comprising a laminated core 1 rotatable about an axis 3 disposed at the center of an annular laminated stationary core 4. The core 1 may be rotated from any desired source of power, as through the medium of a prime mover 17, shown in Fig. 5. The rotor 1, which may constitute a field magnet, is provided with a pair of diametrically disposed north and south salient inductor poles carrying inductive field-magnet windings 2. The stator 4 is provided with a plurality of spaced adjacently disposed and relatively narrow independent inductive armature windings four of which are shown at 5, 6, 7 and 8, which may constitute a stationary armature. The armature windings are separated by angular intervals.

The faces of the salient poles of the rotatable core 1 are also shaped relatively narrow, their width, or the angle subtended by them at the common center 3 of the circles of poles and windings, corresponding to a relatively small fraction of the pole pitch.

The inductive relation between the polar windings 2 and the stator windings 5, 6, 7 and 8 and the distribution of the magnetic field produced by the narrow salient poles are such that, during the maximum induced voltage in each stator windings 5, 6, 7, 8, a zero voltage is produced in other stator windings.

The arrangement of Fig. 1 may be reversed, as illustrated in Fig. 2. The field-magnet stator 9 is here shown provided with the pair of diametrically disposed north and south salient inductor poles 11, of the same narrow nature as heretofore described in connection with Fig. 1, and carrying inductive field-magnet windings 12. The armature 10, rotatable about an axis 3', is shown provided with a plurality of spaced adjacently disposed armature windings, four of which are shown at 13, 14, 15, 16.

The field windings 2 and 12 may be excited from any desired source, not shown, of direct or alternating current. If they are supplied with direct current, the wave form of the pulses produced by the core 1 or 9 in each of the windings 5, 6, 7, 8 or 13, 14, 15, 16, respectively, will be sinusoidal, as shown in Fig. 4. The two sine curves of Fig. 4 are shown reversed because one of the poles is a north pole and the other is a south pole. If, however, the polar windings 2 and 12 are supplied with alternating current, the corresponding wave form of the pulses will have the form shown in Fig. 3.

The frequency of the exciting current can be industrial or much higher. If this frequency is high, the number of waves appearing between $a$ and $b$ in Fig. 3 is correspondingly increased.

By suitable design of the magnetic circuit of the stator 4 or 9 and of the windings 5, 6, 7, 8 or 13, 14, 15, 16 it is possible to obtain, in the case of alternating current, a series of current pulses, having, as illustrated in Fig. 3, any desired shape of envelope $abcd$; for example which is most suitable for the work to be performed, trapezoidal. By suitable choice of the relative sizes of the magnetic field and of the windings 5, 6, 7, 8 or 13, 14, 15, 16, it is similarly possible to control also the duration $t_1$ of each current pulse and the time interval $t_2$ separating the pulses. If such current pulses are used for welding certain metals requiring very short values of $t_1$, advantage can be taken of the fact that the duration $t_1$ of the sinusoidal single-cycle pulse shown in Fig. 4 may be rendered shorter than that of the corresponding pulse shown in Fig. 3.

Each of the windings 5, 6, 7, 8 and 13, 14, 15, 16 of the pulse generator of the present invention will thus deliver to its output circuit a separate series of short-time spaced current pulses of suitable shape and predetermined time duration $t_1$ separated by suitable intervals $t_2$.

It is possible to transmit suitably the combined individual pulses, in appropriate order, to the various load circuits and to modify the combinations of individual pulses, as well as the circuits to which the various combined pulses are delivered.

This may be better understood from Fig. 5. It will be assumed that the source of pulses is similar to that illustrated in Fig. 1. A common return wire 30 is connected to the inductive armature windings 5, 6, 7, etc. The other terminals of those windings are respectively connected by a group of output conductors $a_1$, $b_1$, $c_1$, $d_1$, etc., to a group of brushes 31 contacting with a corresponding portion of a controlling and distributing device 32, which has the form of a rotary controller driven from a shaft 33 in synchronism with the shaft 3 of Fig. 1 or 3' of Fig. 2. The brushes 31 are adapted respectively to cooperate with segments 21, 22, 23 and 24 of the said portion of the controller 32. One of the brushes 31, contacting continuously with a contact ring 25 of the controller 32, is connected to the common return wire 30.

A number of output circuits 29 is thus provided, each transmitting a separate series of individual pulses, the shape of which is shown in Figs. 3 and 4.

By means of suitable segments 26, 27 and 28 cooperating with brushes 34 of the rotary controller 32, it is possible to combine selectively the individual current pulses of the different series produced by the source and supplied to the brushes 31 by the conductors 29 and 30, in any of a large number of combinations and to transmit the combined pulses to a plurality of load circuits 35, 36 and 37.

One of the brushes 34, connected to a common return wire of the load circuits 35, 36 and 37, contacts continuously with a contact ring 29' of the distributor 32, that is continuously connected to the contact ring 25. A great variety of resulting pulses may be obtained with such a distributor. It is possible, for example, to combine the individual pulses from two of the said six armature windings, transmitted by the conductors $a_1$ and $b_1$, so as to produce an elongated pulse having two times the time length $t_1$ shown in Figs. 3 and 4.

It is possible also to elongate similarly the time interval $t_1$ between the combined pulses. This may be effected, for example, by suppressing every second or third current pulse. The pulses from the other three inductive windings, arriving by way of the conductor $d$, and two additional conductors, not shown, may be combined in the same way or in some other way. Various groups of combined pulses may thus be produced, for transmission, by way of the brushes 34 of the rotary distributor 32, to the three respective welding machines 35, 36 and 37.

Obviously, however, the invention is not restricted to use with three load circuits. The current pulses may be selectively combined into as many different groups as there are load circuits.

In some cases the power pulses are all transmitted through only a single output circuit. This would occur, for example, if all of the said armature windings were connected in series, as stated above. The resulting single series of pulses would then be uniform and separated by small intervals $t_2$ as shown in Fig. 6. Such a single series of pulses could also, of course, be produced by some source other than the pulse generator as described above, static or non-static.

A synchonously operating distributing and controlling device of the before-described character could then be utilized to divide this single series of pulses shown in Fig. 6 into a plurality of different series of combined pulses which, as illustrated in Fig. 7, could then be transmitted to different load circuits. The conductors 38 are shown energising a pulse generator 39 which may be of the type already described in connection with Figs. 1 and 2, or of any static type, such, for example, as the thermionic vacuum-tube or the gaseous discharge types. It will be assumed that, receiving an alternating current, of 60-cycle or other frequency, the pulse generator 39 produces a single series of pulses similar to that illustrated in Fig. 6. These pulses from the generator 39 are fed to a synchronous distributing and controlling device 40. If the source is a rotary machine, the coupling may be effected mechanically; if the source is static, the coupling may be effected by means of a synchronous motor 40. The device 40 is designed to transmit in a cyclical order to a plurality of load devices 48, 49, etc., different resulting pulses, formed by different combinations of individual pulses which are delivered through a single output circuit by a source 39 energized by mains 38.

This device 40 is arranged in such a way that the pulse combinations can be easily modified. It has the form of a rotative controller drum with fixed fingers and rotative segments cooperating with a relatively great number of fixed contact fingers or brushes.

One terminal of the source 39 is shown connected to a contact finger O. The other terminal of the source 39 is connected to one terminal of each of two load circuits 48 and 49.

The cylindrical surface of the controller is shown developed into a plane to expose its successively disposed staggered contact members 47, and the annular contact member 46 cooperating with the fixed contact finger O. During the rotation of the drum, its contact members 47 will make contact successively with stationary contact fingers A to L. The number of movable contact members 47 and the number of stationary contact fingers A to L will vary according to the pulse combinations desired to be achieved. Twelve of each are illustrated, as an example, particularly adapted to the carrying out of the feature of the invention illustrated in Fig. 8. The controller is rotated synchronously, in order that the first pulse may be generated at a time when the first movable contact member 46 engages the stationary contact finger A, as shown, the second pulse may be generated at a time when the second movable contact member 47 engages the stationary contact member B, and so on.

The contact fingers A, B and C are shown connected together by a detachable connector X and to the upper terminal of the load circuit 48. The contact fingers G, H and I are connected together by a similar connector $X_1$, and to the same upper terminal of the load circuit 48. The contact members E and F are connected together by a detachable connector Y and the contact members K and L by a similar member $Y_2$ and to the upper terminal of another load circuit 49. The contact members D and J are free, but may be connected to a third load circuit, not shown.

With such connections, the load circuit 48 will receive the first, second, third, seventh, eighth and ninth current pulses, etc., from the pulse generator or other source 39 and the load circuit 49 will receive the fifth, sixth, eleventh, twelfth, etc. This operation will be cyclically repeated once corresponding to each rotation of the drum controller 46.

With the use of the same controller, but merely by changing the detachable connectors grouping the stationary contact fingers A to L, it is obviously possible to supply the load circuits 48 and 49 with other combinations of the individual current pulses from the pulse source 39. For instance, with the arrangement shown in Fig. 7, it is possible to employ from one to six load sources 48, 49 and, in each case, to vary the duration $t_1$ of the combined pulses and the time intervals $t_2$ between them.

The result described in connection with Fig. 7 may be obtained also with a much smaller controller, shown developed into a plane in Fig. 8. The connections of the contact fingers O and A of Fig. 8 are the same as in Fig. 7. Only three short segments 50 are shown in Fig. 8, corresponding to the twelve short segments 47 of Fig. 7, but the contact fingers A to L are divided into four similarly disposed groups of three fingers each for successive engagement by the contact members 50.

If the source 39 of Fig. 8 should embody a generator having several separate inductive armature windings, it would be necessary to associate each of them with a synchronous distributing and controlling device of the type represented in Figs. 7 and 8 or of any other suitable type. If the source 39 should contain only a single pair of inductor poles, as in Figs. 1 and 2, each of its output circuits would produce two current pulses corresponding to each rotation of the rotor. In the system of Fig. 8, with the twelve stationary contact fingers A to L, under such circumstances, the synchronous device would need to turn with a speed equal to ⅙ of the generator speed.

Further modifications will occur to persons skilled in the art, and all such are considered to fall within the spirit and scope of the invention, as defined in the appended claims.

What is claimed is:

1. An intermittent power-supply system having, in combination, means for producing at least one series of current pulses, a plurality of load circuits, means operated in synchronism with the production of the current pulses and connected between the current-pulse-producing means and the load circuits for selectively combining predetermined pulses of the series into as many different combined pulses as there are load circuits, and means for transmitting the combined pulses to the respective load circuits.

2. An intermittent power supply system having, in combination, a pulse generator comprising a rotor and a stator one of which is provided with a plurality of separate angularly spaced inductive armature windings and the other of which is provided with relatively narrow salient field poles disposed adjacent to the windings for producing the pulses in the windings in response to the rotation of the rotor, means for rotating the rotor, a plurality of load circuits, and distributing devices operated in synchronism with the production of the current pulses and connected between the windings and the load circuits for transmitting the pulses selectively to the load circuits and for combining the pulses in different ways to form combined pulses of desired duration and separated by desired time intervals.

3. An intermittent power supply system having, in combination, a pulse generator comprising a rotor and a stator one of which is provided with a plurality of separate adjacent inductive armature windings separated by angular intervals and disposed along the circumference of a circle and the other of which is provided with narrow salient poles, exciting windings on said poles, means for supplying alternating exciting current to said pole windings, means for rotating the rotor to produce a series of time-spaced current pulses in each armature winding, a plurality of load circuits, distributing and controlling devices operated in synchronism with the production of the pulses, and means connecting the said controlling and distributing devices between the said armature windings and the load circuits for selectively combining the pulses to vary the duration of and the time intervals between the combined pulses and for transmitting the combined pulses selectively to the load circuits.

4. An intermittent power supply system having, in combination, a pulse generator comprising a rotor and a stator, one of which is provided with a plurality of separate inductive armature windings disposed with angular intervals along the circumference of a circle and the other of which is provided with salient field poles disposed adjacent to the windings and each having a pole winding, the width of each pole being small compared to the polar pitch, means for supplying exciting current to the said pole windings, and means for rotating the rotor to produce a series of time-spaced current pulses in each armature winding, the said armature windings being positioned so that every armature winding shall be effective to produce a pulse at a time when the other windings of the circle of windings are ineffective.

5. An intermittent power supply system having, in combination, a pulse generator comprising a rotor and a stator, one of which is provided with a plurality of separate inductive armature windings disposed with angular intervals, each having an output circuit, and the other of which is provided with relatively narrow salient inductor poles disposed adjacent to the said windings for producing the pulses in the armature windings, the width of each pole being small compared to the pole pitch, the armature windings being positioned so that each of them shall be effective to produce a pulse in response to the rotation past it of a pole at a time when other windings are ineffective, means for rotating the rotor, a plurality of load circuits, distributing devices operated in synchronism with the production of the current pulses and means connecting said distributing devices between the output circuits and the load circuits to transmit the pulses from the output circuits to the load circuits.

6. An intermittent power supply system having, in combination, a pulse generator comprising a rotor and a stator, one of which is provided with a plurality of separate inductive armature windings disposed with angular intervals along the circumference of a circle and provided with separate output circuits and the other of which is provided with magnetic salient field poles disposed adjacent to the circle of armature windings, means for rotating the rotor to produce a current pulse in the output circuit of each armature winding, a plurality of load circuits, distributing and controlling devices operated in synchronism with the production of the pulses and means connecting said devices between the output circuits and the load circuits to render the output of the output circuits substantially continuous.

7. An intermittent power supply system comprising a source of power adapted to produce at least one series of individual time spaced current pulses, means for giving to said individual pulses a desired shape and duration, at least one output circuit upon said source, a plurality of load circuits comprising load devices such as welding machines, an interconnecting device inserted between said output and load circuits, and contact members in said device adapted to transmit said individual pulses to said load circuits in such a way that each load circuit receives pulses adapted to the work to be performed, while the total power output is substantially constant.

8. An intermittent power supply system comprising a source of power adapted to produce at least one series of individual time spaced pulses of alternating current having a form suitable for electric spot and seam welding, at least one output circuit upon said source, a plurality of load circuits including welding machines, and an interconnecting device inserted between said output and load circuits and adapted to transmit selectively to said load circuits suitable pulses according to the nature of work to be performed by said welding machines.

9. An intermittent power supply system comprising a rotatable source adapted to produce at least one series of individual spaced current pulses, at least one output circuit upon this source, a plurality of load circuits comprising load devices such as welding machines, an interconnecting device inserted between said output and load circuits and means for giving to said current pulses a suitable form, duration and spacing, comprising in said rotatable source spaced armature windings and relatively narrow cooperating inductor poles, the shape and size of those armature windings and poles being adapted to generate in each armature winding time spaced alternating current pulses of a desired form.

10. An intermittent power supply system according to claim 9 in which the number of output circuits is equal to the number of load circuits and the interconnecting device is formed by contact rings and cooperating brushes arranged for connecting each output circuit to a load circuit.

11. An intermittent power supply system according to claim 9 in which the source comprises a plurality of output circuits adapted each to transmit a distinct series of pulses, and the interconnecting device has the form of a synchronous distributing controller adapted to deliver to the various load circuits combined pulses from different output circuits, said combined pulses having suitable resulting forms, durations and time intervals adapted to the nature of work to be performed in respective load circuits.

12. An intermittent power supply system comprising a source of power adapted to produce a single series of individual current pulses, an output circuit upon said source, a plurality of load circuits and a synchronous distributing device having the form of a rotatable controller arranged for distributing and combining the individual pulses delivered to said load circuits, whereby the form, duration and spacing of the combined pulses in each load circuit are respectively adapted to the nature of work to be performed.

13. An intermittent power supply system according to claim 12, in which the current pulses are formed by an intermtitent high frequency current.

14. An intermittent power supply system according to claim 12, in which the distributing device is formed by a synchronously rotated controller comprising a plurality of fingers, cooperating segments adapted to enter in contact with said fingers successively at the beginning of each individual pulse, and connections between said fingers, the source and the load circuits adapted to transmit selectively in a desired order the individual pulses and groups of pulses to said load circuits, as well as to eliminate a part of pulses if desired, said connections being removable and adaptable to the nature of the work to be performed.

15. A system having a source of successive individual power pulses, a plurality of load circuits energized by said pulses and means for delivering to said load circuits a variety of combined individual power pulses formed by groups of different numbers of said individual power pulses, said means comprising synchronous switching elements interposed between said source and each of said load circuits, the closing periods of the said switching elements being equal to the respective durations of said groups of combined power pulses.

16. In a system having a source of successive individual power pulses and a plurality of load circuits energized by said pulses, distributing means for delivering to each of said load circuits combined pulses formed by groups of successive individual power pulses, comprising in series with each load circuit synchronous circuit closing elements, the closed periods of which are equal to the respective durations of said combined pulses.

17. In an intermittent power supply system including a source of at least one series of individual power pulses and a plurality of load devices such as spot or seam welding machines, means for delivering to each load device groups of suitably combined pulses the durations of which are adapted to the nature of work to be performed, comprising synchronous distributors interposed between said source and said load devices and arranged for interconnecting periodically said load devices with said source for different time intervals during which desired numbers of individual power pulses are transmitted to each of said load devices.

18. In a system having a source of successive individual power pulses and a plurality of load circuits selectively energized by different groups of said power pulses according to the nature of work, selective distributing means for delivering to each of said load circuits a resulting power pulse formed by a corresponding number of said individual pulses, comprising synchronous distributing means interposed between the said source and the said load circuits and having switching elements arranged for closing periodically each of said load circuits during a time interval equal to the duration of the said resulting power pulse.

19. In a system having a source of successive individual power pulses and a plurality of load circuits energized selectively by different groupings of said individual pulses according to the nature of work, means for delivering to each of said load circuits a different number of said individual pulses in order to form resulting pulses of suitable durations, comprising synchronous distributing devices interposed between the said source and the said load circuits, said devices having the form of rotative drums with fixed fingers, short movable segments angularly staggered for transmitting each a single individual pulse, and selective pulse grouping elements interposed between corresponding groups of said short segments and each of the load circuits.

20. An intermittent power supply system comprising a plurality of load devices, a load distributing device connected to said load devices and a rotatable generator of the inductor type having a plurality of independent spaced armature windings separated by angular intervals, a cooperating field system with relatively narrow pole pieces and a field distribution adapted for generating separately by said field system in each armature winding a series of intermittent power pulses of suitable form, the said series of pulses being so shifted in time with respect to the others, that during the generation of a pulse by one of said armature windings the other armature windings remain inactive, whereby the overall output of the generator remains substantially constant.

21. In an intermittent power supply system according to claim 20, a distributing device for delivering to each load device suitably shaped and spaced combined power pulses, said device being formed by a synchronous rotating controller comprising fingers which are connected to the respective armature windings and load devices, and segments which are arranged for selectively directing the individual power pulses from the different windings to the various load devices in order to combine them suitably according to the work to be effected.

22. An intermittent power supply system comprising a plurality of load devices energized by periodic power pulses, a load distributing device and a rotative pulse generator adapted for producing a plurality of separate series of said power pulses of suitable shape and duration, separated by no voltage intervals of suitable length, said generator having an armature carrying a plurality of independent armature windings separated by angular intervals and provided with separate output circuits, a cooperating field system provided with relatively narrow pole pieces, the angular width of which is a fraction of the pole pitch, field windings upon said field system, and a field distribution adapted for generating in each of said armature windings a series of suitably shaped power pulses, the duration of which corresponds to non-operative intervals of all other armature windings, whereby the overall power output of the generator remains substantially regular.

23. An intermittent power supply system comprising a plurality of load devices energized by periodic power impulses, a load distributing device and a rotative impulse generator adapted for producing a plurality of separate series of said power impulses of suitable shape and duration, separated by no voltage intervals of suitable length, said generator having an armature carrying a plurality of independent armature windings separated by angular intervals and provided with separate output circuits, a cooperating field system provided with relatively narrow pole pieces, the angular width of which is a fraction of the pole pitch, field windings upon said field system, and a field distribution adapted for generating in each of said armature windings a series of suitably shaped power impulses, the duration of which corresponds to non-operative intervals of all other armature windings, whereby the overall power output of the generator remains substantially regular, said load distributing device being formed by a group of contact elements, such as brushes, connected to the respective output circuits of the generator, a group of similar contact elements connected to the respective load devices, a rotating drum driven by said generator and cooperating with said contact elements, and switching means upon said rotating drum for interconnecting periodically the said armature windings with said load devices for different time intervals during which desired numbers of power impulses are transmitted to each load device.

24. In a power system including a source of adjacent intermittent power impulses and a plurality of load devices energized by said impulses, a synchronous power distributing device interposed between said source and said load devices, comprising a plurality of fixed distributing contact element connected to one terminal of said source through said load devices, a fixed common contact element connected to the other terminal of said source, a controller drum, a long segment upon said drum cooperating in all positions of said drum with said common contact element, and a plurality of staggered short segments cooperating successively with all distributing contact elements, a synchronous motor driving said drum at such a speed that the said power impulses are successively transmitted one by one through successive distributing contact elements, and removable connectors adapted for grouping said fixed distributing contact elements for transmitting to each load device suitable groups of combined power impulses.

25. An intermitent power distributing device according to claim 24 in which all fixed distributing contact elements are arranged in one line parallel to the axis of said drum, the number of short drum segments being equal to the number of fixed said distributing elements.

26. An intermittent power distributing device according to claim 24 in which the fixed distributing contact elements are disposed in a plurality of equally spaced groups adapted to cooperate in turn with a reduced number of short drum segments.

27. In a power system comprising a source of more than one series of intermittent power impulses and a plurality of load devices energized by said series of impulses, one synchronous distributing device for each series, each distributing device being arranged according to claim 24 and all being associated to form a single synchronous controller.

ABRAM SEGAL.

REFERENCES CITED

The following references are of record in the file of this patent:

UNITED STATES PATENTS

| Number | Name | Date |
|---|---|---|
| 510,188 | Pennock | Dec. 5, 1893 |
| 1,194,778 | Paquin | Aug. 15, 1916 |
| 1,769,060 | Hendry | July 1, 1930 |
| 2,098,002 | Guerin et al. | Nov. 2, 1937 |